340-870.11 SR

XR 3,826,868

United States Patent [19]

Nugent

[11] 3,826,868

[45] July 30, 1974

[54] TELEMETERING SYSTEM

[76] Inventor: John A. Nugent, Brighton, N.Y. 11235

[22] Filed: Sept. 26, 1973

[21] Appl. No.: 400,947

Related U.S. Application Data

[60] Division of Ser. No. 216,975, filed Jan. 11, 1972.

[52] U.S. Cl. .................... 178/67, 325/163, 325/320

[51] Int. Cl. ........................................... H04l 27/24

[58] Field of Search ......... 178/67; 325/30, 163, 320

[56] References Cited

UNITED STATES PATENTS

| | | | |
|---|---|---|---|
| 3,206,678 | 9/1965 | Hannon | 325/163 |
| 3,394,313 | 7/1968 | Ellis | 325/30 |
| 3,401,339 | 9/1968 | Kluever | 325/30 |
| 3,643,023 | 2/1972 | Ragsdale | 178/67 |
| 3,769,587 | 10/1973 | Matsuo | 325/320 |

*Primary Examiner*—Ralph D. Blakeslee
*Attorney, Agent, or Firm*—Martin Lukacher

[57] ABSTRACT

A multi-channel telemetering system is described which is capable of transmitting many channels of information over very narrow bandwidths; the herein described system being adapted to telemeter over 100,000 channels of information utilizing a 2 KHz band between each of the adjacent broadcase station frequencies over the AM broadcast band. A plurality of channels is included to provide digital signals which phase modulate one of many carrier frequencies which are separated by small frequency increments over the band. When information is not transmitted, a test code generator phase modulates the carrier so that the carrier is continuously phase modulated. Modulation is accomplished at very low data rates by shifting phase of the carrier 90° in one direction to represent a "1" and 90° in the opposite direction to represent a "0." Numerous channels can be received and monitored at a remote monitoring station. The receiver at the monitoring station includes frequency translation circuits for translating each band to a common band then separating each carrier of the many carriers which lie in each band by means of a narrow band pass filter. The filtered signals are phase demodulated and decoded to derive the several channels of information transmitted by each carrier signal. The demodulated carriers are monitored for the continuous phase modulation in accordance with the test code signal such that any failure in the system is readily detected. The system also provides for priority channels which operate the encoder to transmit priority information when present ahead of information which may be present in other channels. The encoder and phase modulator are also adapted to operate such that complete messages and test code signals are transmitted at rates compatible with the narrow band operation of the system.

14 Claims, 8 Drawing Figures

PATENTED JUL 30 1974

3,826,868

SHEET 4 OF 6

TELEMETERING SYSTEM

This is a division of application Ser. No. 216,975 filed Jan. 11, 1972.

The present invention relates to telemetry systems and particularly to multi-channel telemetry systems.

The invention is especially suitable for use in radio telemetry systems which transmit digital data and enables the data to be telemetered at low power in the AM broadcast band. Other features of the invention provide for low data rate communications over very narrow bands as, for example, may be only one Hz wide.

For the most part, telemetry systems are being designed to transmit large quantities of information at higher and higher data rates. The bandwidth required for telemetry systems has therefore increased such that the VHF, UHF and even higher frequency bands have been assigned to telemetry applications. There are, however, needs for reliable telemetry systems capable of transmitting information over narrow bandwidths. It is particularly desirable to facilitate the transmission of many channels of information over a relatively small range of frequency in low frequency bands. Such low frequency bands have the advantage of not requiring special antennas and also allow the propagation of signals in spite of buildings, obstacles and terrain. For example, radio telemetry capable of operating in the AM broadcast band (540 to 1,600KHz) is especially adapted for use in cities, since the telemetered signal would be capable of propagating through the walls of buildings to a remote monitoring station where many channels of telemetered information could be monitored. Narrow band telemetry is especially advantageous when the AM broadcast band is used, since many telemetry channels can be transmitted in the band between AM broadcast carriers without causing interference with the broadcast stations or being interfered with by broadcast transmissions.

Inasmuch as telemetry systems may be used to communicate information respecting the condition of security devices, process controls and the operating condition of machinery which sustains environmental conditions, it is important that the telemetry system continuously be in proper operating condition and ready to transmit and receive information. To this end, it is desirable to continuously self-test the system, but without interference with its normal operating functions and further, without intr0ducing untoward complexity. It is a feature of this invention to provide a radio telemetry system having narrow band operation such that a very large number of channels can be transmitted even in the broadcast band. A further advantage of the invention is that it affords self-test capability and continuously monitors the system's readiness to transmit information without interfering with information transmission or adding complexity in the design of the system.

Accordingly, it is an object of the present invention to provide an improved telemetry system.

It is another object of the present invention to provide an improved telemetry system for radio telemetry of a large number of channels over a limited bandwidth.

It is a further object of the invention to provide improved telemetering system which combines frequency multiplexing and time multiplexing in a manner such that a very large number of information channels is available for transmission.

It is a still further object of the present invention to provide an improved telemetry system having continuous monitoring (self-testing) of the system to signify the system readiness to communicate information.

It is a still further object of the present invention to provide an improved narrow bandwidth telemetry system capable of transmitting many channels in a limited spectrum and capable of using the broadcast band without interference with existing transmissions and vice versa.

It is a still further object of the present invention to provide an improved telemetry system whereby many transmitting stations can be monitored at a central monitoring station and each channel of information transmitted from each of these stations displayed at the central monitoring station.

It is a still further object of the present invention to provide an improved radio telemetry system having transmission characteristics which do not require a special radiator, (viz., a special antenna, antenna tower or antenna site selection).

It is a still further object of the present invention to provide an improved radio telemetry system which affords a multiplicity of telemetering channels in the AM broadcast band without the need for obtaining operating licenses from government agencies under present regulations.

It is a still further object of the present invention to provide an improved system for transmitting information in digital form without tne need for reference or pilot signals.

It is a still further object of the present invention to provide an improved system for transmitting digital data at very low data rates in a manner whereby spectral energy is contained in a very narrow band thus enabling the transmission of data from a large number of channels within limited bandwidths.

It is a still further object of the present invention to provide an improved telemetry system having bandwidth conserving characteristics which enable the transmission of thousands of channels of information in the portion of the spectrum between frequencies allocated to broadcast stations in the AM broadcast band.

It is a still further object of the present invention to provide an improved telemetering system which assures that a message is transmitted before a successive message is transmitted.

It is a still further object of the present invention to provide an improved telemetry system capable of transmitting messages due to information on certain channels with priority and to provide for repeated transmissions of such priority messages to provide assurances that no such priority messages are lost.

Briefly described, a multi-channel telemetering system embodying the invention includes a plurality of signal transmission links each of which separately transmits a different frequency. Information from a plurality of channels is applied to each different frequency as by encoding the inputs into digital messages to drive a phase modulator in one direction for a digital symbol transmission interval to represent digital information of one type and in the opposite direction during such an interval so as to represent information of the opposite type. Inasmuch as the frequencies transmitted by the links may be separated by small frequency increments, a multiplicity of groups of channels may thus be transmitted to one or more remote receiving stations. Each receiving station is capable of receiving signals from a different plurality of the links. Very narrow band pass filters in each of the receiving stations separate the frequencies from each other. The receivers also contain a plurality of demodulators which separately demodulate the signals and display each channel of information transmitted over each link. Thus, for example, with a frequency separation of 20 Hz, 1,000 channels of information can be telemetered over a 2 KHz bandwidth. A 2 KHz bandwidth is available between each successive pair of broadcast station frequency allocations in the AM broadcast band, thereby affording the capability for the transmission of over 100,000 channels of information through the use of the broadcast band. The use of phase modulation and demodulation together with narrow band filtering provides for acceptable radio frequency transmission characteristics in the broadcast band with low (e.g., under 100 milliwatts) power. Accordingly, the telemetering system may not require any governmental licenses under present regulations.

In the event that the reliability is an important factor, means may be provided for continuously modulating the signals transmitted by each link whenever a link does not transmit a message. Such modulation may readily be provided by a test code generator which modulates the signals to alternately shift their phase in opposite directions thereby representing opposite types of digital information. Upon reception, the absence of alternation between opposite types of digital information is detected to indicate a possible system failure.

The foregoing and other and additional objects, advantages and features of the present invention will become more readily apparent from a reading of the following description when taken in connection with the accompanying drawings in which.

Figure 1:
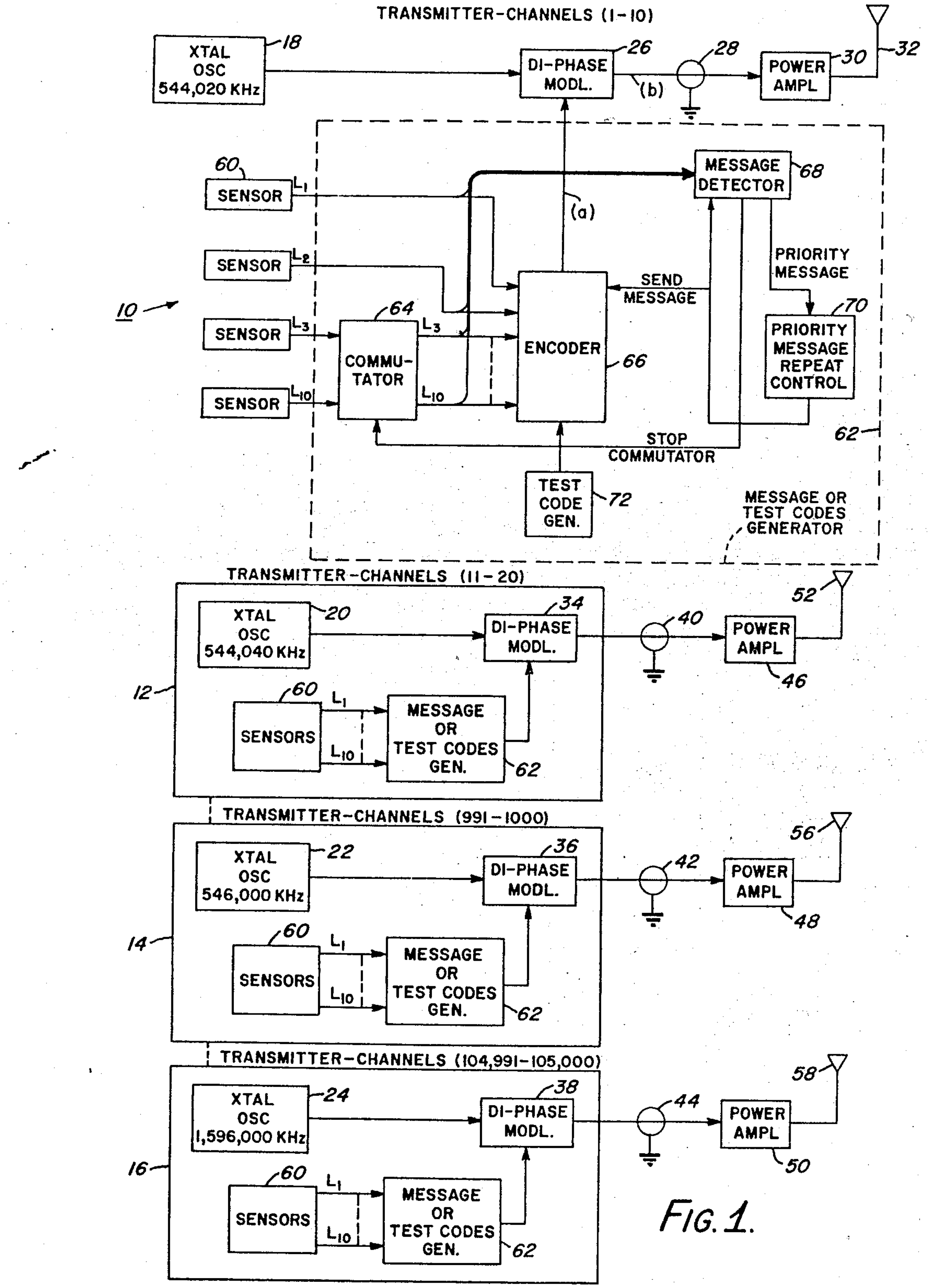
FIG. 1 is a block diagram of the transmitter of a telemetry system provided in accordance with the invention.

Referring to FIG. 1 there is shown four transmitters, 10, 12, 14 and 16. Each of these transmitters transmits 10 channels of telemetry information and is representative of a multi-channel radio telemetry system provided by the invention which is capable of transmitting 105,000 channels of information at AM broadcast band frequencies. The broadcast band extends from 540 to 1,600 KHz. A broadcast station may be assigned to operate at a frequency in the broadcast band which is an integral multiple of 10 KHz. For example, broadcast stations are assigned to 540 KHz, 550 KHz, 560 KHz and at 10 KHz increments thereafter up to and including 1,600 KHz. In order to avoid interference no one locality has stations assigned very closely adjacent to each other. There are usually at least 40 KHz separations between different stations in each locality. In any event, the center of the band between adjacent stations is generally clear. Accordingly, the 2 Kz band essentially disposed between the broadcast station frequencies is used in this embodiment of the invention. Specifically, 100 frequencies spaced from each other by 20 Hz increments are used; thus affording 100 transmission links each on a separate frequency between each adjacent pair of broadcast stations. Each frequency is capable of transmitting 10 channels of information. Accordingly, 100 channels can be transmitted for each 2 KHz bands over the broadcast band from 540 to 1,600 KHz. There are 105 separate 2 KHz bands available for telemetry channels. The system therefore has the capability, in its herein illustrated form, to transmit 105,000 separate telemetry channels. Signal transmission characteristics in any locality will make certain 2 KHz bands more desirable than others. Inasmuch as there are 105 bands available each adapted to telemeter 1,000 channels, it is to be expected that sufficient clear and substantially interference-free channels will be available for telemetering purposes in accordance with the invention.

In order to simplify the illustration, the transmission links for channels 1 to 10, 11 to 20, 991, to 1,000, and 104,991 to 105,000 are shown for purposes of illustration. These transmitter channels utilize different frequencies. The transmitter channels 1 to 10, 11 to 20 and 991 to 1,000 are selected because they all utilize the same 2 KHz band. The transmitter 10 for channels to 1 to 10 uses the first available 20 KHz increment which lies at 544.020 KHz. The second transmitter 12 which handles channels 11 to 20 is separated by a 20 HZ increment and uses a frequency of 544.040 KHz. The 100th channel appears at the upper end of the band and uses 546.000 KHz. The last transmitter 16 is at the end of the last frequency slot from 1594 to 1596 KHz at the upper end of the band. Transmitter channels 104,991 to 105,000 use the highest frequency in this last band which is 1596.000 KHz.

The frequencies of the signals which are transmitted by each link are generated by a crystal oscillator, thus the crystal oscillator 18 in the first transmitter 10, generates the signal frequency of 544.020 KHz. The crystal oscillator 20, 22 and 24 in the transmitters 12, 14 and 16 generate their respective frequencies which were mentioned above. Each transmission link for each transmitter is similar and includes a diphase modulator 26 which shifts the phase of the signal from the oscillator either 90° in one direction or 90° in the opposite direction. This phase shift takes place during certain intervals of time having finite duration and which repeat each other at a slow rate. In order to provide for narrow band communications it is desirable that the intervals be relatively long, say 2 to 3 seconds in duration. The bit rate is therefore under one half cycle per second. Notwithstanding such slow rate of modulation, the carrier signal which is generated by the oscillator is continuously transmitted. The output of the modulator may be connected by way of a coaxial cable 28 to a power amplifier 30 which is located near an antenna 32 which transmits the telemeter data to the receiving station. It will be noted that each of the other transmitters, 12, 14 and 16 has a similar diphase modulator 34, 36 and 38 respectively, connected through coaxial cables 40, 42 and 44 to power amplifiers 46, 48 and 50 which are located near their respective antennas 52, 56 and 58.

The telemetry input for each transmitter is a group of sensors 60. These groups each contain 10 sensors having outputs indicated at $L_1$ through $L_{10}$ in the case of each transmitter. While 10 sensors are indicated, a fewer or greater number of sensors may be provided with compensatory changes in the duration of commutation and encoding cycles. Ten sensors is however, a representative number of sensors for each transmission link frequency. These sensors may be switching devices or other digital devices which are in one condition or state to represent information and in the opposite state when no information is represented. For example, the sensors may be switches contained in doors, locks or other security devices. When a door is opened, the switch is closed to represent an unsecure condition. Otherwise, the switch is open. Since the door is then shut, no information is to be transmitted. The sensors which provide outputs $L_1$ and $L_2$ are designated as priority sensors and provide priority inputs. These sensors may be switches connected to the inner door of a safe, an inner office or to an alarm system, the opening or actuation of which is information which requires priority transmission.

The sensors provide the 10 channel inputs to message or test code generators 62, one of which is provided for each transmitter for each group of channels. The generator 62 for the transmitter 10 is representative and includes a commutator 64 which commutates the sensor inputs $L_3$ to $L_{10}$ which do not have priority. These sensor inputs $L_3$ to $L_{10}$ are applied successively to encoder 66. Similarly the priority sensors which provide inputs $L_1$ and $L_2$ are also connected to the encoder. When any of the sensor inputs is closed designating the presence of information, a message detector 68 is actuated and applies a send message command to the encoder. The encoder then converts the message presented to it by the 10 inputs $L_1$ to $L_{10}$ into a series of binary signals which occur successively at the slow bit rate and drives the diphase modulator 26 which transmits the message. The message detector also puts out a stop commutator command which inhibits the commutator until the message is encoded by the encoder and is completely transmitted. In the event that one of the priority inputs is responsible for the message, the message detector 68 enables the priority message repeat control unit 70 which causes the same message to be transmitted at plurality of times, say 3 times. This assures that a priority message will be transmitted and received at the receiving station. So long as input information does not appear in any of the sensor inputs $L_1$ to $L_{10}$ the encoder is not operated to transmit messages. However, a test code generator 72 is provided in each generator 62. This test code generator continuously supplies the encoder with digital information which alternates in value (viz., between binary 1 and binary 0). In the event a message is to be transmitted that message supplants the test code in the encoder and is transmitted. However, in the absence of a message the test code propagates through the encoder and drives the di-phase modulator to continuously modulate the carrier signal with the test code. Accordingly, several thousand signals may be simultaneously transmitted, each carrying multiple channels of telemetry information.

Figure 2:
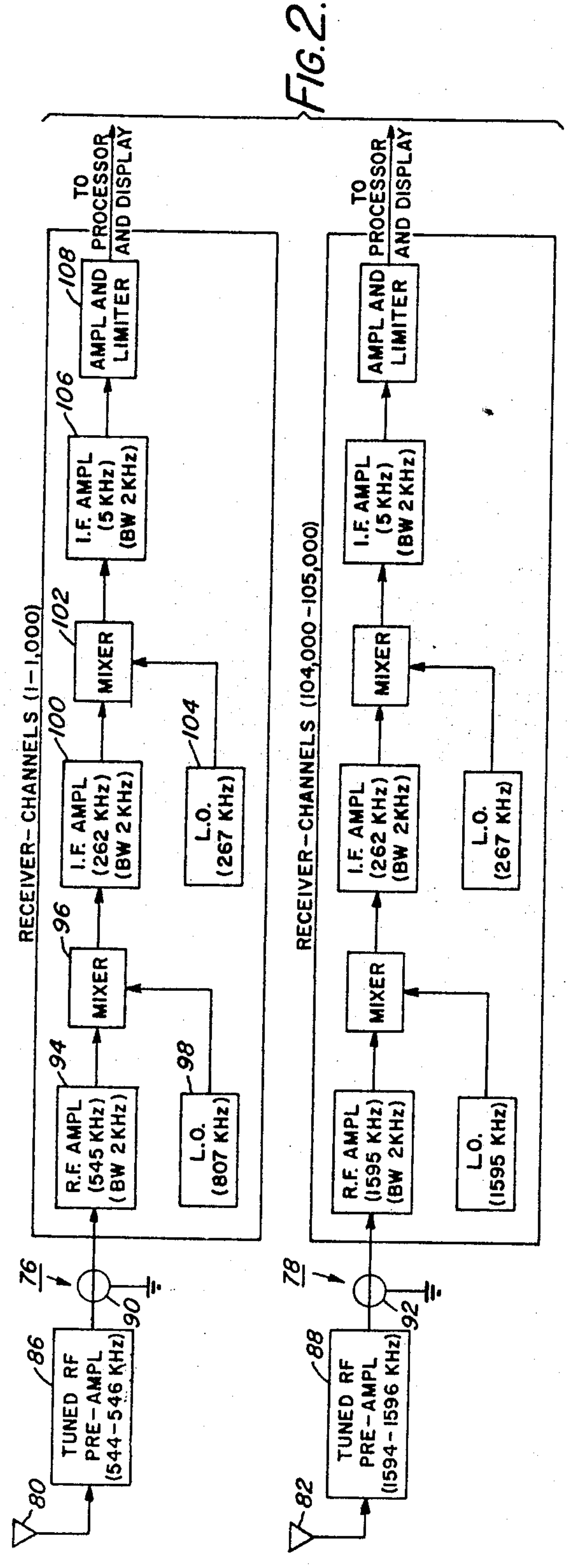
FIG. 2 is a block diagram of the receiving portion of the telemetry system provided by the invention.

The receiving systems may be located remotely from the transmitters, say at a central station, and include a plurality of receivers which are capable of segregating the channels into 1,000 channel groups each corresponding to a different one of the 2 KHz bands in the broadcast band. Thus, 105 different receivers are used; two of which 76 and 78 are illustrated in FIG. 2 as being representative. The receivers have antennas 80 and 82. A common antenna may be used for any receivers at the same remote point. It will be appreciated that different groups of channels may be monitored at different points by providing one or more receivers for the same channels each of which is located at a different point. The invention thus affords the feature of diversity reception.

Each receiver includes a tuned radio frequency preamplifier 86 and 88 which is desirably located close to its respective antenna and is connected to the remainder of the receiver by a coaxial cable 90 or 92. The preamplifier for the lower frequency band is tuned to pass that band (viz., 544 to 546 KHz). Each band is separated by means including its own tuned preamplifier. Further selectivity is provided by superheterodyne detection as will be explained hereinafter. The highest frequency band is separated by the amplifier 88 which passes from 1,594 to 1,596 KHz. Each receiver also includes a double conversion super-heterodyne system. The signals from the coaxial cable 90, in the case of the receiver 76, are further simplified in RF amplifier 94 which is tuned to pass the same band as the tuned RF preamplifier 86. A mixer 96 mixes the amplified signal with an injection from a local oscillator 98. In this illustrative example, the local oscillator frequency is 262 KHz above the center of the frequency band of interest thus an IF amplifier 100 selects the desired difference frequency from the mixer output. This difference frequency is a band of frequencies 2 KHz wide and centered at 262 KHz. Another mixer 102 receives an injection from a local oscillator 104 and from the IF amplifier 100. The local oscillator injection frequency is selected to be 267 KHz. A difference frequency selected by an intermediate frequency amplifier 106 thus is in a band 2 KHz wide centered at 5 KHZ. Thus the band of information channels which extends from 544 to 556 KHz is translated to a band from 4 to 6 KHz by the double conversion process. This 4 to 6 KHz is a common band into which all of the broadcast frequency bands are translated. A common band is used for each of processing and display, since processing and display equipment of the same design can be applied to the output of each receiver.

The receiver 78 has an arrangement of RF amplifiers, mixers, and IF amplifiers similar to the receiver 76. It will be noted, however, that the RF amplifier and local oscillator injections to the first mixer in the receiver 78 are higher to accommodate the higher band of broadcast frequencies which is received by that receiver 78. Each receiver includes an amplifier and limiter 108, but inasmuch as information is transmitted by phase modulation, hard limiting in the amplifier/limiter 188 may be used for noise elimination purposes.

Figure 3:
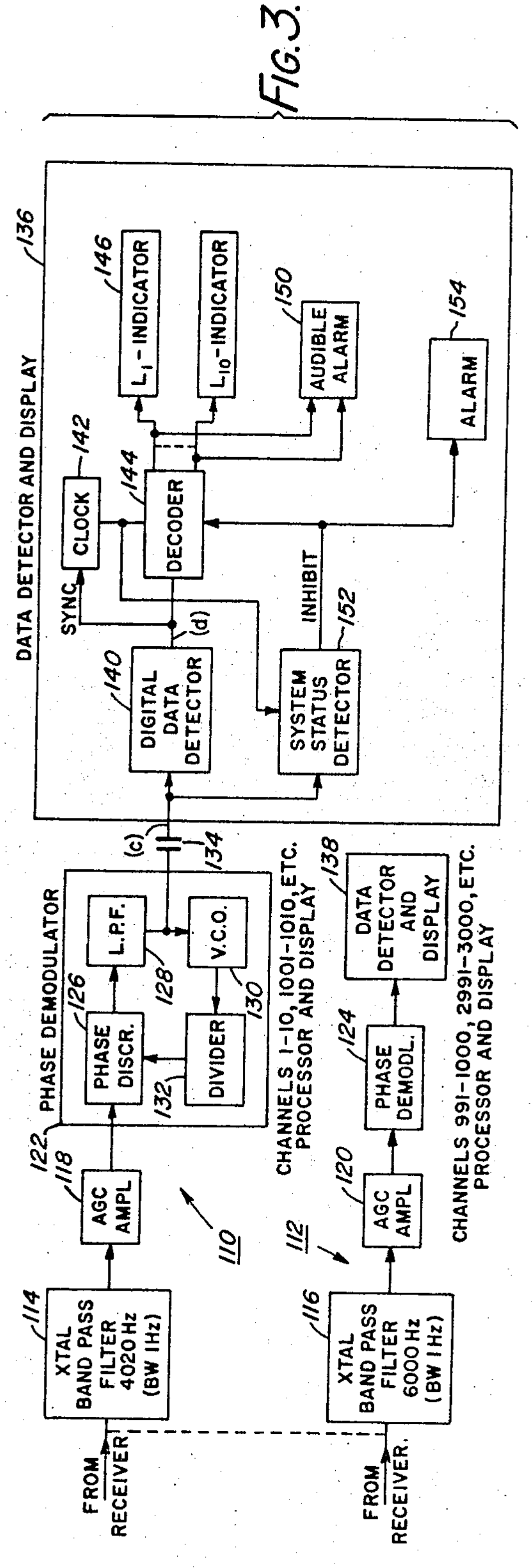
FIG. 3 is a block diagram of the processor and display portion of the receiving section of the telemetry system.

Referring to FIG. 3 the processor and display are illustrated for the first group of 10 channels and for the last group of 10 channels in each band. In other words, the processor and display unit 110 in the upper part of FIG. 3 is adapted to process and display channels 1 to 10, 1001 to 1010, 2001 to 2010, etc. There are 999 additional processor and display units including a processor and display unit 112 for the last group of 10 channels in each band (viz., channels 991 to 1,000, 2991 to 3000, etc).

The 100 different groups of 10 channels, each of which groups is transmitted by a different carrier frequency are segregated by crystal band pass filters 114 through 116.

Each of the crystal filters is adapted to pass a 1 Hz bandwidth at 20 Hz increments. The filter 114 thus is tuned to 4,020 Hz and the last of the filters in each of the bands 116 is tuned to 6000Hz. Each of the filtered signals is signal conditioned by an automatic gain control amplifier 118, in the case of the unit 110, and 120 in the case of the unit 112. The amplified signals are then phase demodulated; phase demodulators 122 and 124 in the units 110 and 112 which are similar being provided for the purpose. Each of these phase demodulators contains a phase lock loop including a phase discriminator 126, a low pass filter 128, a variable frequency, preferably voltage controlled, oscillator 130 and a frequency divider 132. The voltage controlled oscillator 130 desirably operates on a frequency which is an integral number of times higher than the frequency of the filter 114 of its respective unit. The divider 132 then divides the oscillator signal by the aforementioned integral multiple. Thus signals of like frequency are applied to the phase discriminator 126. The low pass filter then assures that only the slowly varying electronic signal which contains the phase information is extracted. This low pass filter 128 may have a frequency pass band of less than 1 Hz; thus passing only the phase information. The output of the filter 128 is an analog signal which varies in amplitude in accordance with the phase modulation of the carrier signal extracted by a receiver such as the receiver 76 or 78 and the band pass filter. Accordingly, the analog signal at the output of the phase demodulator 122, associated with the receiver 76, contains the information from telemetered channels 1 to 10. If the processing unit 110 were connected to receiver 78 it would transmit the information telemetered in channels 104,001 through 104,010 It will be appreciated, therefore, that different combinations of receivers and processing and display units may be used depending upon which telemetering channels are of interest and are to be received at any remote points. It is a feature of this invention to provide a high degree of flexibility in the selection and utilization of any combinations of groups of telemetering channels which may be desired.

The output of the phase demodulator is coupled to the data detector and display unit, preferably through an alternating current coupling circuit having a very long time constant, such as a large capacitor 134. The data detector and display 136 which is associated with the processor and display unit 110 and the data and detector and display 138 in the unit 122 may be similar. It will be appreciated, of course, that the design of the processor and display unit is the same except for the frequency at which the crystal band pass filters, 114, 116, etc, are designed to operate. Data is detected from the analog signal by means of a digital data detector 140. The data detector may be an amplitude sensitive device such as a Schmidt trigger circuit. The detected data is used to synchronize a clock oscillator 142. A decoder 144 converts the serial stream of digital data into parallel form. A group of indicators 146 is provided each corresponding to a different one of the telemetry inputs $L_1$ to $L_{10}$ and may be lamps which are illuminated to indicate a closure of a switching device in the sensor which provides an $L_1$ to $L_{10}$ input.

The digital data in parallel form is also routed to an audible alarm 150 which is activated when any of the indicators 146 are activated.

It will be recalled that an alternating phase shift first in one direction and then in the opposite direction is always imposed on the signals as a test code. Accordingly the analog signal produced by the phase demodulator will on average be an alternating signal. Should the signal fail to alternate or remain at one level for a period of time, say 2 bit periods, the presence of a system problem is indicated. This is accomplished by a system status detector 152 which is enabled in the absence of an alteration in the phase demodulator output for 2 bit periods as indicated by clock pulse cycles from the clock oscillator 142. Upon detection of a system status problem an inhibit command is applied to the decoder and a system alarm 154 is indicated.

The systems and circuits which may be used in accordance with the preferred embodiment of the invention will be discussed in detail in connection with FIGS. 5 to 8.

Figure 4:
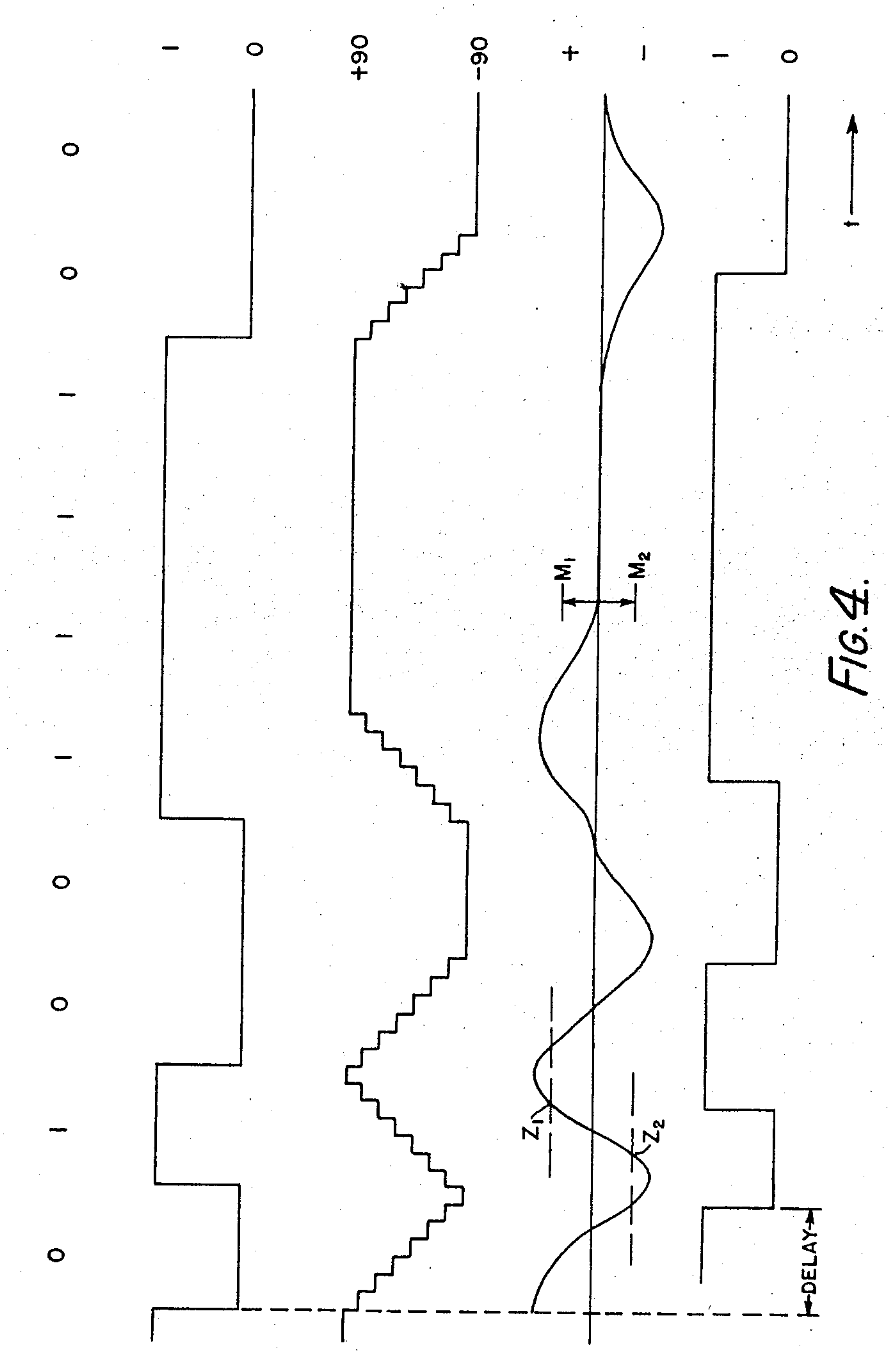
FIG. 4 is a series of waveforms which are generated in the course of operation of the system illustrated in FIGS. 1, 2 and 3.

Consider now the waveforms of the principal signals which are produced in the operation of the system. FIG. 4 shows the waveforms for a randomly selected sequence of bits 0, 1, 0, 0, 1, etc. Waveform (a) is the non return to 0 output which this sequence of bits produces at the input to the diphase modulator (e.g., 26 in FIG. 1). The di-phase modulator progressively shifts the phase of the carrier signal 90° in one direction, say the delay direction, to represent the binary 0 and 90° in the opposite direction to represent the binary 1. The modulation is progressive in incremental steps throughout the bit period. This modulation may be continuous or incremental during the bit period. An incremental phase modulator is described hereinafter in connection with FIG. 6. The phase modulated carrier appears at (b) adjacent to the coaxial line 28 in FIG. 1. After transmission across the radio link to the receiver and phase demodulation in the phase lock loop demodulator 122, 124 (FIG. 3), an analog signal which varies in amplitude substantially in the same way as the phase modulated carrier is produced except that it returns to zero after each change from "0" to "1" to "0," as shown in waveform (c). This waveform is translated into a digital NRZ waveform substantially the same as the modulating signal applied by the encoder (66, FIG. 1) to the di-phase modulator 26, except for a delay due to the detection process. The digital data detector, by deciding that once a level $Z_1$ is exceeded, the output is a binary 1 until the level falls below $Z_2$. This is then a binary 0 until $Z_1$ is again exceeded, therefore, produces the output data waves indicated (d) in FIG. 4. It will be apparent that various types of digital data detectors such as comparators and Schmidt trigger circuits could be used to convert the analog wave shown at (c) into the digital signal shown at (d).

By decoding the digital signal in the decoder 144 a group of outputs is applied to indicators $L_1$ to $L_{10}$ corresponding to the sensors 60 ($L_1$ to $L_{10}$); thus completing the telemetry channels.

Figure 5:
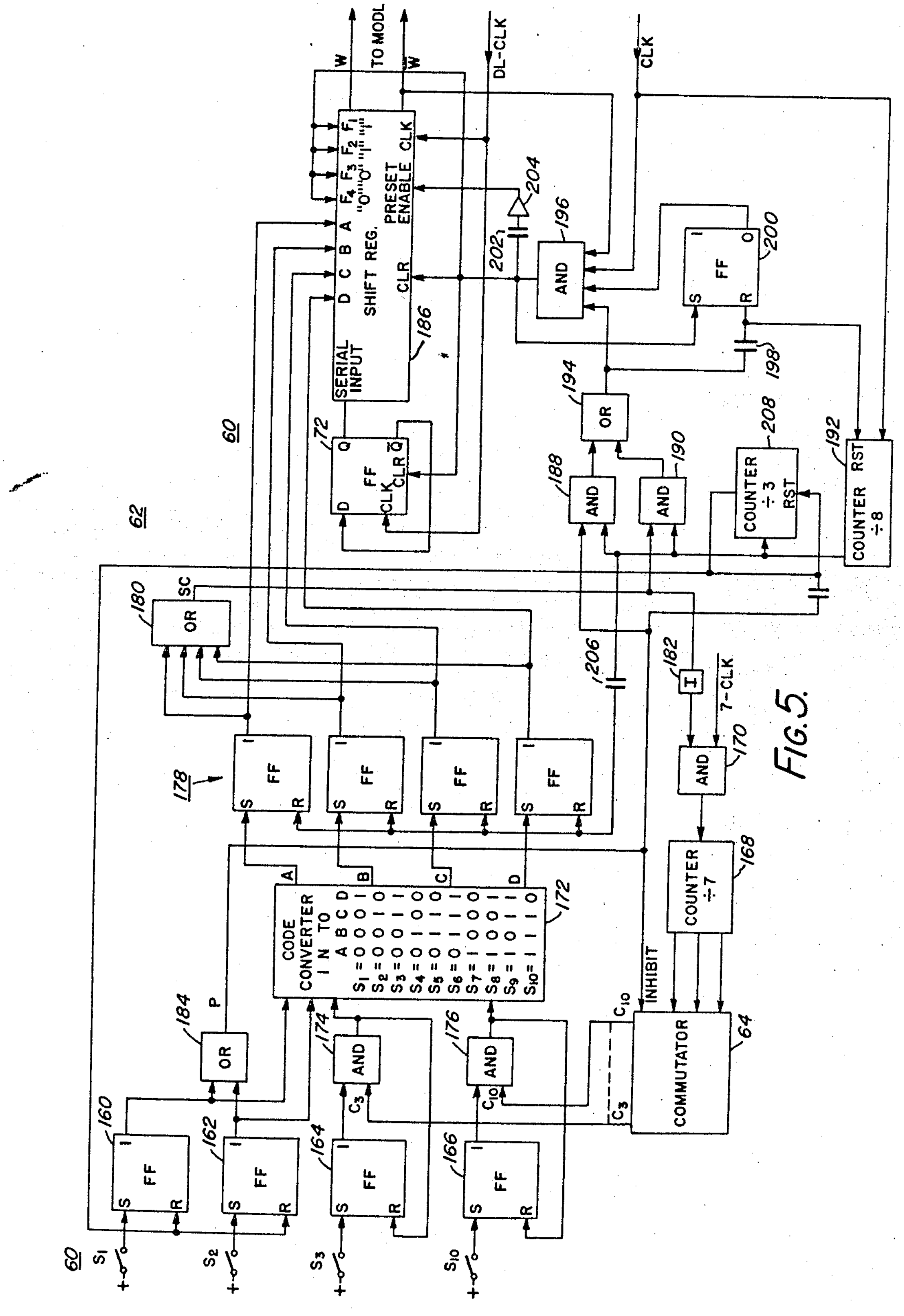
FIG. 5 is a more detailed block diagram of the message and test code generator including the commutator and encoder of one of the group of transmitter channels shown in FIG. 1.

The message in test code generator 62 is shown in FIG. 5. The sensors 60 which apply information to the generator 62 are shown as being 10 switches $S_1$ to $S_{10}$. Two of these switches $S_1$ and $S_2$ are priority sensors. When any of these switches closes it sets its associated one of 10 flip-flops. Only the first, second, third and the 10th sensor switch $S_1$, $S_2$, $S_3$ and $S_{10}$ and their associated flip-flops 160, 162, 164 and 166 are shwon to simplify the illustration. The commutator 64 provides a succession of commutator pulses $C_3$ to $C_{10}$. The commutator 64 itself may be an integrated circuit which provides these pulses $C_3$ to $C_{10}$ in sequence under the control of a divide by 7 counter 168. This counter receives clock pulses which have a frequency of 7 times the bit rate which is the rate at which individual data bits are transmitted. These clock pulses are supplied by a clock pulse generator not shown. Clock pulses are applied to the counter 168 through an AND gate 170 which is enabled whenever none of the sensors provide information (viz., when all of the switches $S_1$ to $S_{10}$ are open). The priority sensors 160 and 162 are connected to a code converter 172. The flip-flops 164 to 166 are successively sampled when the commutator pulses $C_3$ to $C_{10}$ successively enable AND gates 174 through 176 which are associated with the flip-flops 164 through 166. The code converter 172 is essentially a 1/N to ABCD converter in that it converts the input presented by the one output of the "1" to 10 flip-flops 160–166 which is set into a four bit code ABCD. The coding being such that a different code is provided for any one of the switches being closed. The $S_1$ switch has top priority such that the code for the closure of the $S_1$ switch, namely ABCD equals 0001, is produced notwithstanding that any of the other switches is closed.

Similarly the $S_2$ switch has second priority and the $S_2$ code, namely ABCD equals 0010, is produced when the $S_2$ switch is closed, notwithstanding that any of the other switches $S_3$ to $S_{10}$ are simultaneously closed. The code converter itself may be a set of gates which is designed in accordance with conventional logic design techniques to provide the codes indicated in the block 172. The code converter also includes logic circuits whereby the presence of an $S_1$ switch closure and the setting of flip-flop 160 will inhibit all of the other inputs to the converter. Similarly, a closure of the $S_2$ switch will inhibit the inputs to the converter corresponding to $S_3$ to $S_{10}$ closures. A connection from the output of each of the AND gates 174 to 176 to its associated flip-flop 164 to 166 causes their flip-flops to be reset immediately after sampling. It will be apparent that only one output to the code converter will be provided for any closures of the switches $S_3$ to $S_{10}$ at any one time due to the successive sampling of the gates by successive commutator pulses $C_3$ to $C_{10}$. If any of the switches are closed the converter will transmit a "1" pulse on at least one of the output lines ABCD, thereby causing at least one of the flip-flops 178 connected to the output lines ABCD to be set. The "1" output of these flip-flops 178 is applied to an OR gate 180. The OR gate 180 thus will provide an output whenever any of the sensor switches $S_1$ to $S_{10}$ is closed. This output also designates that a message is ready for transmission. The OR gate output pulse is indicated as the SC pulse and is applied to the AND gate 170 through an inverter 182 and inhibits the AND gate 172 from supplying clock pulses to the counter 168. Accordingly, the commutator stops at its last position. An OR gate 184 is also provided which is connected to the one output of the priority flip-flops 160 and 162. Thus if either of the priority inputs exists, an inhibit pulse indicated at P will be applied to the inhibit input of the commutator and also stop the commutator. Accordingly, once a message is stored in the flip-flops 178 and is ready for transmission no further messages will be generated. The system then stops and waits until the message is transmitted. This permits the code generator to provide output data to the modulator so as to drive the modulator at a very slow data rate consistent with the narrow band operation desired of the system.

The code converter 172 and a shift register 186 are part of the encoder 66. The shift register has 8 present inputs $F_1$ to $F_4$ and ABCD. A serial input is also provided. The test code generator 72 is connected to the serial input. The test code generator 72 is a D type flip-flop which is clocked by clock pulse at the data rate which is delayed by a small fraction of the data bit interval. By virtue of a connection between the Q output of the flip-flop and the D input thereof the Q output will change state each clock pulse period and apply a succession of "1" followed by "0" bits to the serial input of the flip-flop. The flip-flop also is clocked by the DL-CLK pulses. Accordingly, in the absence of message inputs (viz., inputs to the $F_1$ to $F_4$ and ABCD preset inputs of the shift register) the serial input will propagate through the shift register and provide outputs on the data lines W and W. These data lines are connected to the modulator (i.e., the di-phase modulator 26 shown in FIG. 1). The circuitry of the modulator will be described in greater detail hereinafter in connection with FIG. 6.

In the event that either a P or an SC output is provided, one of the AND gates 188 or 190 will be enabled. The other input to the AND gates 188 and 190 is provided by a divide by 8 counter 192. This counter will be full (viz, have a count of 8 stored therein) except during message transmission intervals. Accordingly the AND gates 188 and 190 will be enabled and will pass either the P or SC output through an OR gate 194. This OR gate 194 provides one input to an AND gate 196. The leading edge of the output transmitted by the OR gate 194 is transmitted through a capacitor 198 to reset a flip-flop 200. Similarly the leading edge of the output, which passes through the capacitor 198, resets the counter 192. With the flip-flop 200 reset, the AND gate 196 has a second enabling input. It is desired to start a message transmission on a "0" output bit. Accordingly, when the W output of the shift register is high the AND gate 196 will be ready to pass the next clock pulse. The clock pulse is applied to both the counter 192 and to an input of the AND gate 196. When the clock pulse propagates through the AND gate 196, it is applied to the clear input of the shift register 186 as well as to the clear input of the D flip-flop test code generator 72. The shift register is then cleared and is ready to receive the message stored in the flip-flops 178. Transfer of the message to the shift register occurs when the clock pulse leading edge is capacitively coupled via a capacitor 202 and an amplifier 204 to the preset enable input of the shift register 186. ABCD pulses from the flip-flops 178 then become stored in the last four stages ABCD of the shift register. Simultaneously, the first four stages of the shift register store the inputs $F_1$, $F_2$, $F_3$, $F_4$ which are preset to be 1100 by a clock by connecting the clear input to the $F_1$ to $F_4$ preset inputs of the shift register.

The $F_1$ to $F_4$ bits constitute a synchronizing code which is detected in the receiver so as to enable the receiver to read out the ABCD message code which immediately succeeds it. The next 8 clock pulses cause the shift register to read out the synchronizing code $F_1$ to $F_4$ and the message ABCD which follows the synchronizing code. 8 clock pulses are also counted in the counter 192 and when the counter reaches a count of 8, a reset pulse is applied to the reset inputs of the storage flip-flops 178 through a capacitor 206. The AND gates 188 and 190 are then also enabled to receive the next message. The flip-flop 200 is also set by the clock pulse which propagates through the AND gate 196 so as to prevent the shift register from being cleared until the next message transmit command occurs.

In the event that the message is due to one of the priority sensors $S_1$ to $S_2$, it is desirable that the message be repeated 3 times notwithstanding that the switch $S_1$ and $S_2$ might have opened sometimes during 3 message transmit intervals. To this end a counter 208, which divides the pulses received each time the divide by 8 counter 192 receives a count of 8, is provided. This counter is reset any time a new P pulse occurs but not if the P pulse persists. Accordingly, a capacitor 210 applies the P pulse output of the OR gate 184 to the reset input of the counter 708. When the counter reaches a count of 3 it also resets itself. The output of the counter is connected to the reset inputs of the flp-flops 160 and 162. These flip-flops are therefore not reset until after 3 message intervals and the priority inputs will appear at the input of the code converter 172 for at least 3 message intervals and be encoded 3 times into 3 identical messages which are applied to the modulator.

Figures 6, 7:
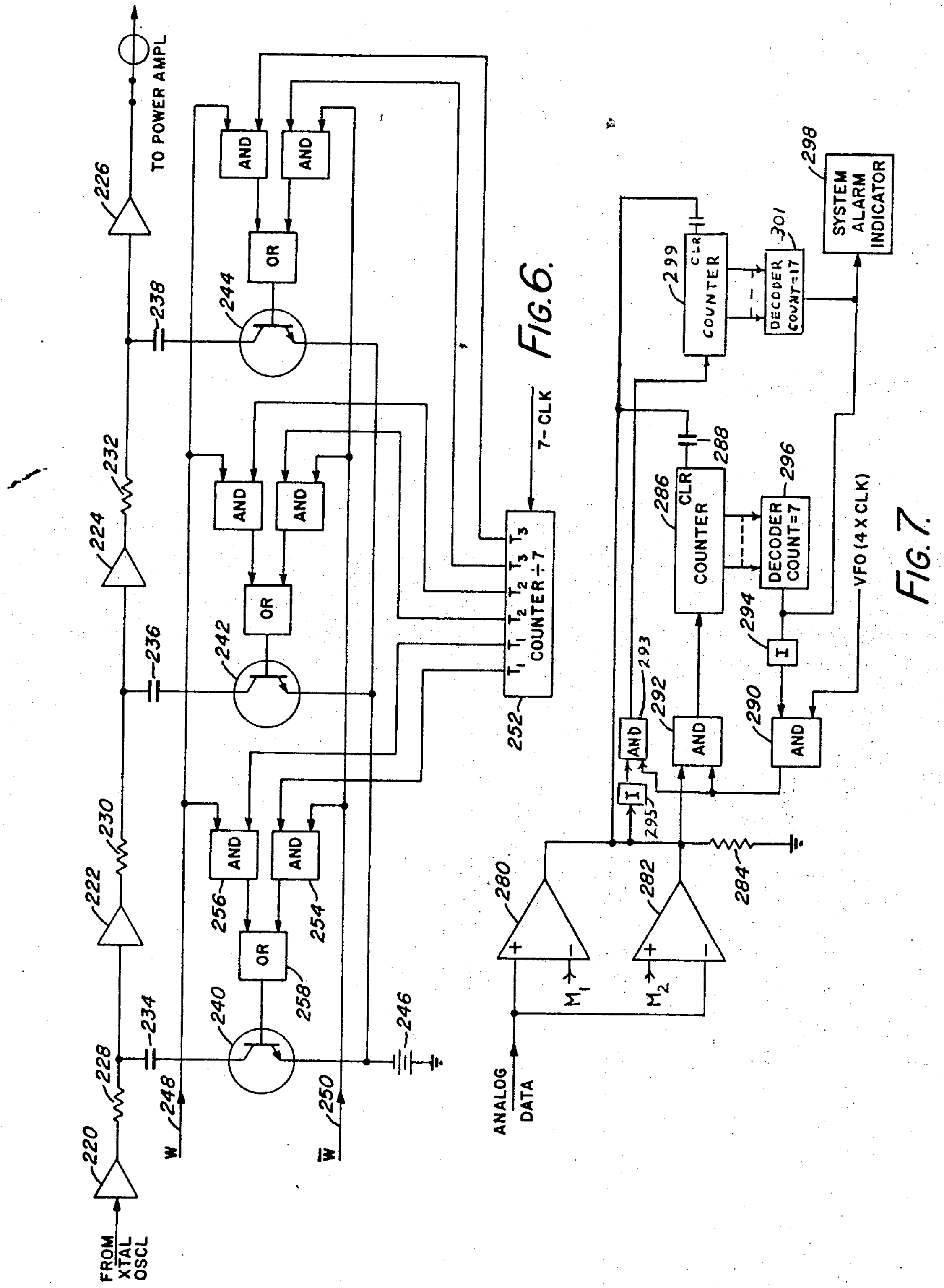
FIG. 6 is a schematic diagram of the di-phase modulator used in the transmitter channel shown in FIG. 1.
FIG. 7 is a block diagram of the system status detector which is part of the data detectors and display and is used in each of the channel processor and display systems shown in FIG. 3.

The di-phase modulator is shown in FIG. 6. It includes a ladder type phase shift network containing 3 amplifiers, 220, 222, 224 and an output amplifier 226. The series elements of the network are resistors 228, 230 and 232 which are connected between the amplifiers. The shunt arms are capacitors 234, 236 and 238. Each of these shunt capacitors is connected in series with a separate transistor switch 240, 242 and 244. The transistors receive operating potential from a battery 246 and are normally biased to cut off. The transistors are switched on in a succession which depends upon the value of the data bits W and W which appear on data lines 248 and 250. Switching is accomplished such that the capacitors 234, 236 and 238 are successively and cumulatively switched into the network when the data to be transmitted is a "0" (W is high) and in the opposite direction when the data to be transmitted is a 1 and W is a high. Such incrementally increasing phase shift is represented also in waveform (c) in FIG. 4. Switching is controlled by a divide by 7 counter 252 which counts clock pulses having a rate equal to 7 times the data rate. The output of the first stage of this counter indicated at $T_1$ and $T_1$ are connected to the base of the transistor 240 by separate AND gates 254 and 256 and via an OR gate 258. The AND gate 254 which receives the $T_1$ counter output also receives the W data output. A similar combination of AND and OR gates is connected in the same manner to the remaining two stages of the counter 252. Thus, when the data bit is zero and the counter is initially reset at the start of each data bit interval all of the transistor switches 240, 242 and 244 will be on thereby inserting maximum phase shift (plus 90°) in the carrier signal line. As the count progresses one, then two then all three transistors will be disconnected from the line thereby disconnecting the shunt capacitors 234, 236 and 238 from the ladder network. At the end of the bit period all of the capacitors will be disconnected. As the next data bit is a 1, the transistors will be switched on but in opposite order to the order in which they were switched off, thus the phase shift will increase again the same amount, 90° in the opposite direction, to represent the binary "1" bit. The capacitors have progressively increasing values of capacitance which are desirably binarily related in order that the increase in total capacity will vary and approximately equal as steps during each of the 7 increments of each data bit period.

Referring to FIG. 7 there is shown a pair of operational amplifiers 280 and 282. A reference potential equal to $M_1$ as shown in waveform (c) of FIG. 4 is applied to the inverting input of one of these amplifiers and $M_2$ to the direct input of the other amplifier 283. The analog data from the output of the phase demodulator (122 FIG. 3) is applied to the direct input of one of the operational amplifiers 280 and to the inverting input of the other 282. The operational amplifiers thus act as a slicer circuit which produces an output voltage across a resistor 284 so long as the analog data has an amplitude more than $M_1$ and below $M_2$. It will be recalled that the analog output produced by the phase demodulator must, if the system is operating properly, return to zero every data bit interval. This is because the voltage controlled oscillator catches up in phase with received signal during the time of one bit, producing a zero error signal. Accordingly, the absence of an output having a value in excess of $M_1$ or below $M_2$ for a period of 2 data bit periods is taken as a criterion of improper system operation.

To this end, a counter 286 which is cleared by way of a capacitor 288 by the voltage across the resistor 284 whenever a transition in that voltage occurs, such a transition corresponding to a data bit changing from 1 to 0 or vice versa, receives clock pulses at 4 times the receiver clock rate, as can be obtained from the variable frequency oscillator 306 (FIG. 8), which are applied thereto by way of two AND gates 290 and 292. The AND gate 290 receives an input through an inverter 294 from a decoder 296 which is connected to the counter stages. When the decoder detects that a count of 7 is stored in the counter 286, the AND gate 290 is inhibited thus preventing further clock pulses from being applied to the counter, and a system alarm indicator 298 is actuated. Otherwise, clock pulses continue to pass through the AND gate 290. As noted above, so long as the analog data does not have an amplitude greater than $M_1$ or less than $M_2$, an output voltage will not appear across the resistor 284 thereby enabling AND gate 293 via inverter 295. If the condition of the analog data level lying between the amplitude levels $M_1$ and $M_2$ persists for 17 data rate times, or 4.25 data bits periods, another counter 299 which counts the VFO pulses causes an output to be produced by a decoder 301 which actuates the alarm indicator 290 such as may be a lamp or buzzer. A change in the data from "1" to "0" or vice versa provides a reset pulse to the reset input of the input 296. The system status detector is therefore reset, when data is again properly flowing through the system.

Figure 8:
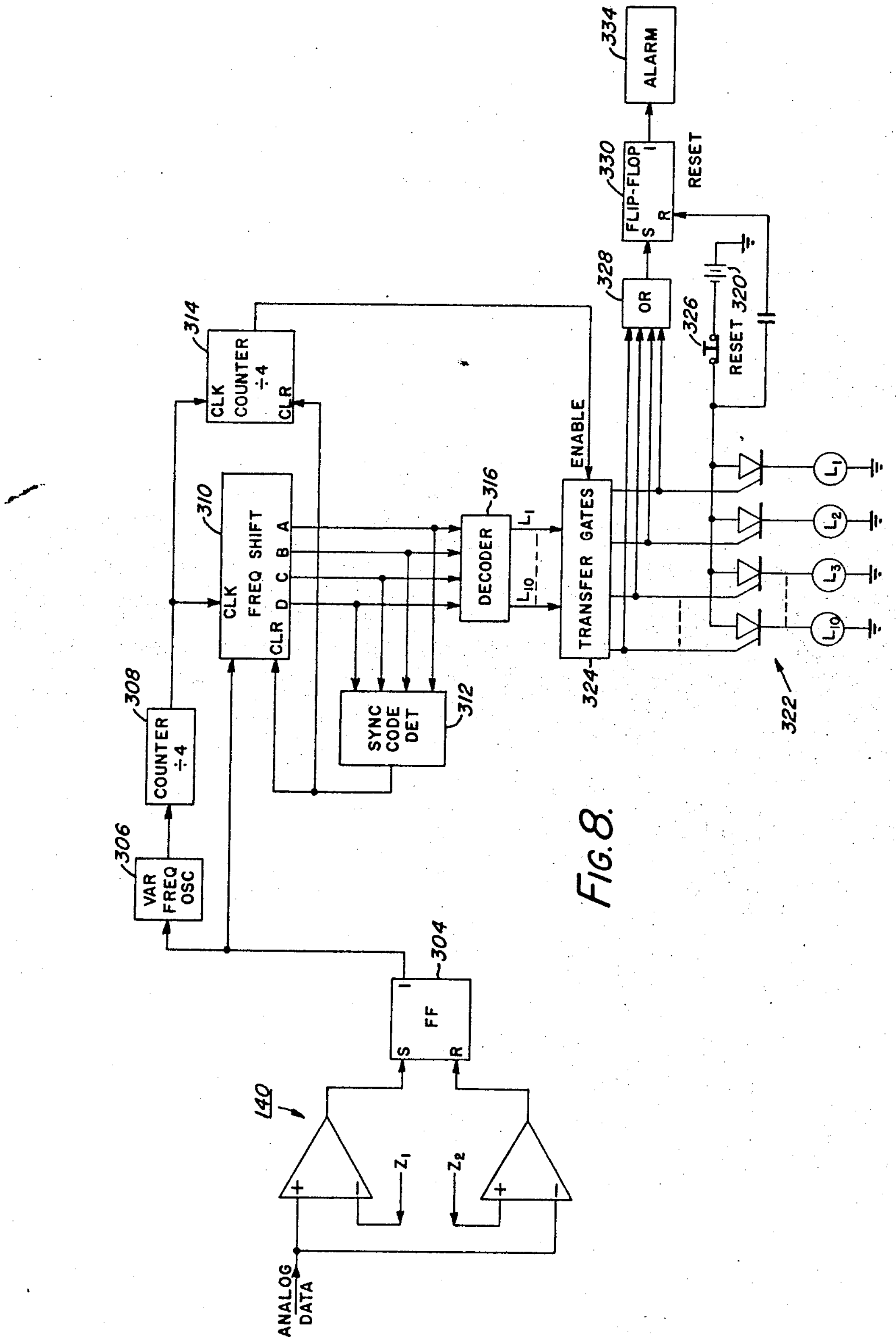
FIG. 8 is a block diagram of the data detector and displays for each of the groups of channels and which is contained in the processor and display units shown in FIG. 3.

Referring to FIG. 8, the data detector 140 may be a Schmidt trigger or as illustrated in FIG. 8, a pair of operational amplifiers having reference levels $Z_1$ and $Z_2$ applied thereto. The magnitudes of these levels $Z_1$ and $Z_2$ is indicated in waveform (c) or FIG. 4. An output is applied to the set input of a flip-flop 304 when the amplitude of the analog input data exceeds $Z_1$ and to the reset input of the flip-flop when the magnitude of the analog data is less than $Z_2$. The flip-flop will then be set and reset to represent "1" and "0" bits respectively. The receiving system is self clocking through the use of a variable frequency oscillator 306 which desirably has a nominal frequency equal to 4 times the expected data rate. This oscillator is controlled by being synchronized by the transitions in the data signal appearing at the one output of the flipflop 304. Clock signals at the data rate are obtained by dividing the variable frequency oscillator output by 4 in a counter 308. The data from the flip-flop 304 is shifted into the serial input of a shift register 310 by clock pulses from the counter 308 which clocks the shift register 310. A sync code detector 312 produces an output when four successive bits $F_4$. The sync code detector clears the shift register and also clears another divide by 4 counter 314. The counter 314 counts the next 4 clock pulses. During these next four clock pulses the 4 bit message ABCD will be shifted into the shift register. These 4 bits are applied to a decoder 316 which provides 10 outputs $L_1$ through $L_{10}$ corresponding to the 10 data inputs at the transmitting end of the system. Indicators may be 10 lamps $L_1$ through $L_{10}$ which are applied with DC power from a battery 320 through individual silicon control rectifiers (SCRs) 322. When the counter 314 reaches a count of 4 transfer gates 324 are enabled and a trigger pulse will be applied to the control input of one of the SCRs 322. Accordingly one of the lamps $L_1$ to $L_{10}$ will be illuminated. The SCRs will remain conductive until manually reset by means of a reset button 326. The pulses transferred through the gate 324 are applied by way of an OR gate 328 to flip-flop 330. The flip-flop may be reset manually when the push button 326 is actuated, since actuation of the push button generates a pulse which is transmitted to a capacitor 332 through the reset input of the flip-flop 330. The flip-flop, when triggered, actuates an audible alarm 334 until manually reset.

From the foregoing description, it will be apparent that there has been provided an improved telemetry system. The system as described herein has the capacity of handling 105,000 channels of telemetry information. Various systems and circuits for permitting the system to operate at low data rates so as to transmit information over so many channels in a limited bandwidth have been described. Variations and modifications in the herein described system and circuits will undoubtedly suggest themselves to those skilled in the art. Accordingly, the foregoing description should be taken as illustrative and not in any limiting sense.

What is claimed is:

1. A system for transmitting information which comprises a. a source which continuously provides carrier signals of constant frequency, b. means for shifting the phase of said carrier signals alternately in opposite directions in the absence of said information, c. means for shifting the phase of said signals in accordance with said information when said information is present, d. means for continuously transmitting said phase shifted carrier signals.

2. The invention as set forth in claim 1 wherein said information is provided at a plurality of inputs, means for multiplexing said inputs so as to provide a modulating signal, and means for applying said modulating signal to said phase shifting means as set forth in paragraph (c) of claim 1.

3. The invention as set forth in claim 2 wherein each of said plurality of inputs is a separate sensor, said multiplexing means includes means for encoding said inputs into digital signal messages having different combinations of "1" and "0," and said modulating means includes means for shifting the phase of said carrier signal 90° in one direction to represent a "1" and 90° in the opposite direction to represent an "0."

4. The invention as set forth in claim 3 wherein said encoding means comprises a code converter, a commutator, and a shift register means including said commutator for successively sampling a plurality of said inputs, said sampled inputs being applied to said converter to provide said messages, means for transferring said messages to said shift register, and means for inhibiting said commutator when information is present at any of said inputs until said message is sequentially read out of said shift register into said modulating means.

5. The invention as set forth in claim 4 wherein said phase shifting means as set forth in paragraph (b) of claim 1 includes means for continuously generating signals representing alternately "1"s and "0"s, and means for applying said last named signals to the serial input of said shift register.

6. The invention as set forth in claim 3 wherein each of said sensor inputs is a separate switching device which is set to represent the presence of information, means for resetting said switching devices for said plurality of sensor inputs which are sampled by said commutator upon the sampling thereof, and means for resetting other of said switching devices for those of said sensor inputs having priority only after messages corresponding to said sensor inputs are read out of said shift register a plurality of times, and means connecting said priority sensor input switching devices to said commutator for inhibiting said commutator while said priority sensor input devices are set.

7. The invention as set forth in claim 3 wherein said modulating means includes a phase shift network, in said carrier signal path, a data input line for carrying signals representing said "1"s and "0"s, and means for changing in said one direction during a data bit transmission interval, the phase shift interposed by said network when said line carries a "1" signal and for changing in said opposite direction, during a data bit transmission interval, the phase shift interposed by said network when said line carries an "0" signal.

8. The invention as set forth in claim 7 wherein said network is a ladder network having a plurality of separate switching devices connected in series, each in a different shunt branch of said network, a counter having a plurality of stages, means for applying a plurality of clock pulses to said counter at least equal in number to its counting capacity during each data bit transmission interval, gates connecting the outputs of said counter which represent the number of pulses stored therein and the complement of said number to said switching devices, said gates being connected to said data line for enabling those gates connected to said counter outputs which represent said number and those gates connected to said counter outputs which represent the complement of said number, when said line carries a "1" and an "0" respectively.

9. The invention as set forth in claim 1 wherein said means for continuously transmitting is a radio link to a remote receiving station.

10. A receiving system for data carried on a selected carrier frequency which is phase modulated in accordance with said data, said systems comprising a. a narrow-band pass filter having a passband at said frequency which is about 1 Hz wide.

b. a phase demodulator including a loop having a phase discriminator output connected to a low pass filter having an upper frequency cut off of less than 1 Hz, a variable frequency oscillator controlled by said low pass filter output, said variable frequency oscillator output and said narrowband filter output being coupled to the inputs of said phase discriminator and c. means responsive to the amplitude of said low pass filter output for converting said low pass filter output into digital data.

11. The invention as set forth in claim 10 wherein said carrier is continuously phase modulated in opposite directions at the data rate in the absence of data signals, further comprising means responsive to said low pass filter output for detecting the absence of changes in amplitude for monitoring system status.

12. The invention as set forth in claim 11 wherein said system status monitoring means comprises means for comparing said low pass filter output with reference amplitude levels for detecting and providing an output when said low pass filter output is above or below said reference levels, a counter means for applying pulses to said counter at a multiple of said data rate so long as said comparing means output is provided, means for resetting said counter in response to a transition in said comparing means output, and means for providing an alarm indication when said counter reaches a predetermined count.

13. The invention as set forth in claim 10 including means for converting said low pass filter output into a sequence of digital signals, a second variable frequency oscillator, means for controlling the frequency of said oscillator in accordance with said digital signals to provide clock signals.

14. The invention as set forth in claim 13 including a shift register means for applying said digital signals to the serial input of said register and shifting said signals through said register with said clock signals, a decoder responsive to a plurality of parallel outputs of said register for decoding said parallel outputs into a plurality of channels, each of said channels having an output indicator for designating the reception of data in said channel, and means responsive to the presence of a synchronizing message at said parallel register outputs for enabling the transfer of a data message from said decoder to said indicators.

* * * * *

PO-1050
(5/69)

UNITED STATES PATENT OFFICE
CERTIFICATE OF CORRECTION

Patent No. 3,826,868 Dated July 30, 1974

Inventor(s) John A. Nugent

It is certified that error appears in the above-identified patent and that said Letters Patent are hereby corrected as shown below:

In the Abstract, Line 21. Before "then" insert --and--

Column 6, Line 1. After "transmitted" insert --,--

Column 6, Line 66. After "108" change "," to --.--

Line 67. Cancel "but inasmuch" and substitute --Inasmuch--

Column 7, Line 1. Change "188" to --108--

Column 7, Line 25. After "112" insert --,--

After "which" insert --demodulators--

After "similar" insert --,--

Line 65. Change "122" to --112--

Column 8, Line 8. After "provided" insert --,--

Column 9, Line 7. Change "in" (first occurrence) to --or--

Column 9, Line 27. After "sensors" insert --flip-flops--

Column 10, Line 20. Change "present" to --preset--

PO-1050
(5/69)

UNITED STATES PATENT OFFICE
CERTIFICATE OF CORRECTION

Patent No. 3,826,868 Dated July 30, 1974

Inventor(s) John A. Nugent -- 2 --

It is certified that error appears in the above-identified patent and that said Letters Patent are hereby corrected as shown below:

In the drawings:

FIG. 1 blocks 18, 20, 22 and 24 - the comma's should be decimal points.

FIG. 4. The waveforms should be identified by letters (a), (b), (c), and (d).

FIG. 5. 60 should be 66, and the capacitor at the bottom-middle of the sheet should be labeled 210.

FIG. 6. $T_1$ $T_1$ $T_2$ $T_2$ $T_3$ $T_3$ should be $\overline{T}_1$ $T_1$ $\overline{T}_2$ $T_2$ $\overline{T}_3$ $T_3$

Signed and sealed this 26th day of November 1974.

(SEAL)
Attest:

McCOY M. GIBSON JR.
Attesting Officer

C. MARSHALL DANN
Commissioner of Patents